United States Patent
Todeschini et al.

(10) Patent No.: US 10,861,050 B2
(45) Date of Patent: Dec. 8, 2020

(54) LOW-ENERGY ALERT BEACONS AND METHODS OF USING THE SAME

(71) Applicant: Hand Held Products, Inc., Fort Mill, SC (US)

(72) Inventors: Erik Todeschini, Camillus, NY (US); Melissa Rentz, Maple Grove, MN (US)

(73) Assignee: Hand Held Products, Inc., Fort Mill, SC (US)

(*) Notice: Subject to any disclaimer, the term of this patent is extended or adjusted under 35 U.S.C. 154(b) by 239 days.

(21) Appl. No.: 15/643,994

(22) Filed: Jul. 7, 2017

(65) Prior Publication Data

US 2019/0012705 A1    Jan. 10, 2019

(51) Int. Cl.
| | |
|---|---|
| G06Q 30/02 | (2012.01) |
| H04W 4/38 | (2018.01) |
| G08B 5/36 | (2006.01) |
| H04W 4/80 | (2018.01) |
| H04W 4/70 | (2018.01) |
| H04W 52/02 | (2009.01) |

(52) U.S. Cl.
CPC .......... G06Q 30/0267 (2013.01); G08B 5/36 (2013.01); H04W 4/38 (2018.02); H04W 4/70 (2018.02); H04W 4/80 (2018.02); H04W 52/0216 (2013.01); H04W 52/0229 (2013.01); H04W 52/0254 (2013.01)

(58) Field of Classification Search
CPC ...... G06Q 30/0267; H04W 4/80; H04W 4/70; H04W 4/38; H04W 52/0216; H04W 52/0229; H04W 52/0254; G08B 5/36
USPC ........................................................ 340/635
See application file for complete search history.

(56) References Cited

U.S. PATENT DOCUMENTS

| | | | | |
|---|---|---|---|---|
| 8,126,728 | B2 * | 2/2012 | Dicks ................... | A61B 5/0022 705/2 |
| 8,545,436 | B2 * | 10/2013 | Robertson ............ | A61B 5/0006 604/66 |
| 8,917,645 | B2 | 12/2014 | Kopikare et al. | |
| 9,215,075 | B1 * | 12/2015 | Poltorak ................. | H04L 63/04 |
| 9,485,344 | B2 | 11/2016 | Mahasenan et al. | |
| 9,589,403 | B2 | 3/2017 | Lingan et al. | |
| 2006/0163349 | A1 | 7/2006 | Neugebauer | |

(Continued)

FOREIGN PATENT DOCUMENTS

KR 101862248 B1 * 5/2018

OTHER PUBLICATIONS

Enable or Disable Eddystone GATT Configuration Service [online] [retrieved Feb. 3, 2017]. Retrieved from the Internet: <URL:http://support.bluecats.com/customer/portal/articles/2611265-enable-or-disable-eddystone-gatt-configuration-service>. (dated Jan. 19, 2017) 4 pages.

(Continued)

Primary Examiner — John A Tweel, Jr.
(74) Attorney, Agent, or Firm — Alston & Bird LLP

(57) ABSTRACT

Provided is an improved beacon, associated system, and methods of using the same. In particular, provided is an improved beacon that upon actuation, is modified from an idle state to a non-idle state, where the beacon transmits advertisement packets. Once the advertisement packets are received and/or acted upon, the beacon is modified from non-idle state to idle state. Accordingly, the beacon efficiently provides access to or monitoring of remote locations and, thus, has reduced maintenance costs and an increased lifetime.

20 Claims, 6 Drawing Sheets

(56) References Cited

U.S. PATENT DOCUMENTS

2007/0115873 A1* 5/2007 Kim .................. H04L 12/12
                                                370/318
2008/0051667 A1   2/2008  Goldreich
2013/0109342 A1   5/2013  Welch
2015/0139051 A1   5/2015  Gonia
2016/0183029 A1   6/2016  Kang
2017/0046945 A1   2/2017  Englot et al.

OTHER PUBLICATIONS

Office Action for corresponding Chinese Application No. 201821079629.X dated Dec. 28, 2018, 3 pages.
Extended European Search Report for corresponding European Application No. 18182290.9 dated Sep. 18, 2018, 8 pages.
Communication pursuant to Article 94(3) for European Application No. 18182290.9, dated Mar. 20, 2020, 4 pages.
Notice of Grant for Chinese Application 201821079629.X, dated Mar. 9, 2019, pages.
Patent Certificate for Chinese Application No. 201821079629.X , 2 pages.
Communication pursuant to Article 94(3) issued in European Application No. 18182290.9, dated Oct. 13, 2020, 5 pages.

* cited by examiner

LOW-ENERGY ALERT BEACONS AND METHODS OF USING THE SAME

BACKGROUND

Beacons have become a popular tool to transmit information, such as alerts or warnings as to the occurrence of certain events. For instance, beacons have been used to indicate weather conditions of a remote area or indicate information regarding customers or users passing by a beacon. The beacon typically broadcasts information over a short range communication network, such as Bluetooth, or a fixed radio-frequency identification (RFID) range, which may be received by a master, e.g., a computing device, within range of the beacon. The master can then connect to the beacon and act on the information, such as by relaying the information to an individual or updating a database with the information. Traditionally, beacons transmit signals continuously at pre-determined intervals of time. The signals or advertisement packets can be modified to include a wide variety of information tailored to the specific event to which a user is being alerted and/or to the specific beacon from which the signal is sent. Using beacons to transmit the desired information allows access to or monitoring of remote locations where full scale computing devices may not be able to be located and/or users of the desired information may not be able to or want to enter on a regular basis.

Applicant has identified a number of deficiencies and problems associated with conventional beacons and associated systems and methods. Through applied effort, ingenuity, and innovation, many of these identified problems have been solved by developing solutions that are included in embodiments of the present invention, many examples of which are described in detail herein.

SUMMARY

In general, embodiments of the present invention provided herein include methods, apparatus, and computer program products for facilitating an improved beacon.

In some example embodiments, a beacon may be provided including a processor configured to adjust the beacon from idle mode to non-idle mode in response to the activation of an actuator and from non-idle mode to idle mode; a transmitter in communication with the processor and configured to transmit an advertisement packet over a short range communication network; a receiver in communication with the processor and configured to receive an indication from a master; and an actuator in communication with the processor and configured to receive an input from a user and/or external environment. In some embodiments, the processor may be configured to change the beacon from idle mode to non-idle mode and to direct the transmitter to transmit the advertisement packet when the actuator receives the input from the user and/or external environment, and the processor is configured to change the beacon from non-idle mode to idle mode when the receiver receives the indication from the master and the indication indicates that the advertisement packet has been received and/or acted on. The advertisement packet may comprise a beacon identifier, an actuator identifier, an actuator state indicator indicative of a state of the actuator, or a combination thereof. The actuator may be a button configured to be pressed by the user, a sensor configured to be activated by sensing a parameter, a microphone module configured to be activated by receiving a sound signal, or a combination thereof.

In some embodiments, the transmitter transmits the advertisement packet over a Bluetooth low energy (BLE) network at pre-defined intervals of time when the beacon is in non-idle mode. In some embodiments, the beacon comprises a light emitting diode (LED) configured to provide a visual indication of the transmitter transmitting the advertisement packet, and in some embodiments, the LED is configured to be activated when the actuator receives the input from the user and/or external environment and is configured to be deactivated when the receiver receives the indication from the master and the indication indicates that the advertisement packet has been received and/or acted on.

In some embodiments, the processor may be configured to direct the transmitter to stop transmitting the advertisement packet when the receiver receives the indication from the master and the indication indicates that the advertisement packet has been received and/or acted on.

Another embodiment of the present invention provided is a system including an electronic device that includes a processor configured to change the electronic device from idle mode to non-idle mode and from non-idle mode to idle mode; a transmitter in communication with the processor and configured to transmit an advertisement packet over a short range communication network; a receiver in communication with the processor; and an actuator in communication with the processor and configured to receive an input from a user and/or external environment. The system further may include a client configured to transmit an indication to the receiver and a server configured to communicate with the client and configured to receive the advertisement packet, determine whether the server can address the advertisement packet, and act on the advertisement packet. In some embodiments, the processor of the electronic device may be configured to change the electronic device from idle mode to non-idle mode and to direct the transmitter to transmit the advertisement packet when the actuator receives the input from the user and/or external environment; and to change the electronic device from non-idle mode to idle mode when the receiver receives the indication from the client and the indication indicates that the advertisement packet has been received and/or acted on. The advertisement packet may include an electronic device identifier, an actuator identifier, an actuator state indicative of a state of the actuator, or a combination thereof In some embodiments, the electronic device may be a beacon and the short range communication network may be a Bluetooth low energy network. The client may be configured to transmit the advertisement packet to the server wherein the advertisement packet notifies the server to perform an action based on receiving the advertisement packet and the server may be configured to transmit the indication to the client at which point the client is configured to transmit the indication to the electronic device. In some embodiments, the client may be configured to transmit the indication to the receiver over the short range communication network using Generic Attribute Profile (GATT) services.

In some embodiments, the processor may be configured to maintain the electronic device in non-idle mode until the receiver receives the indication from the client and the indication indicates that the advertisement packet has been received and/or acted on. In some embodiments, the processor may be configured to direct the transmitter to stop transmitting the advertisement packet when the receiver receives the indication from the client and the indication indicates that the advertisement packet has been received and/or acted on.

Further, in some embodiments, the electronic device may include a light emitting diode (LED) configured to provide a visual indication of the transmitter transmitting the advertisement packet.

In yet another example embodiment, a method may be provided including receiving, from a beacon and by a receiver of a master, an advertisement packet, wherein the advertisement packet was transmitted by the beacon after being modified from idle mode to non-idle mode in response to an activation of an actuator; determining, by a processor of the master, a request indicated by the advertisement packet; and transmitting, by a transmitter of the master, an indication to the beacon that the advertisement packet has been received by the master, wherein the indication indicates to the beacon that the beacon should stop transmitting the advertisement packet and return to idle mode. The advertisement packet may include a beacon identifier, an actuator identifier, an actuator state indicative of a state of the actuator, or a combination thereof.

In some embodiments, the method may include acting, by the processor of the master, on the request indicated by the advertisement packet, which may include alerting an individual and/or third device as to the request, storing information in the advertisement packet, computing information in response to the request, or a combination thereof.

BRIEF DESCRIPTION OF THE DRAWINGS

The accompanying drawings illustrate embodiments of the invention, and, together with the specification, including the general description above and the detailed description which follows, serve to explain the features of the present invention.

DETAILED DESCRIPTION

Figure 1:
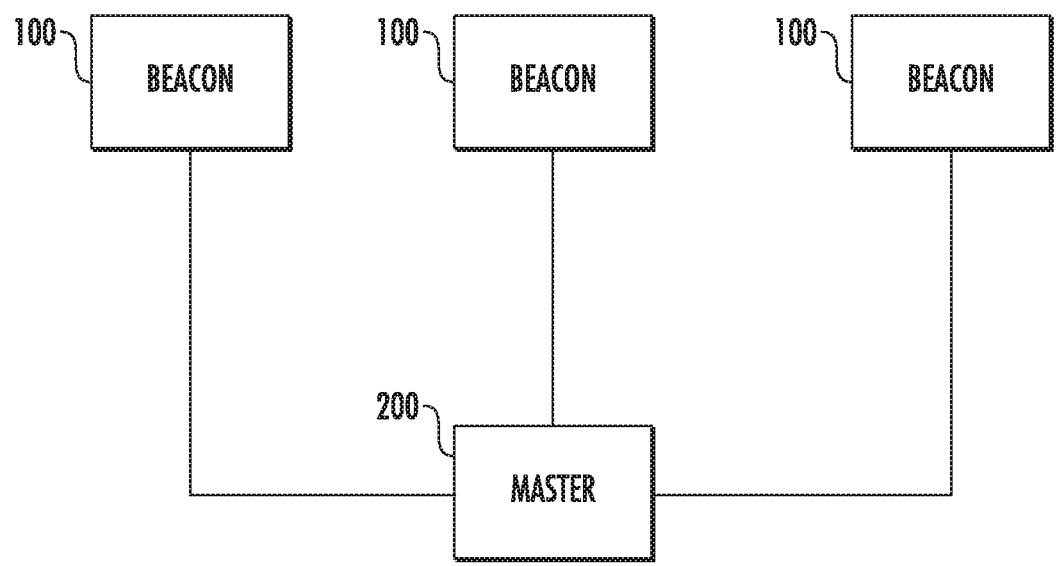
FIG. 1 illustrates a schematic of a system using a beacon according to an example embodiment.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the term "transmitter" refers to any component that can generate radio waves for communication purposes while a "receiver" is used to generally refer to any component that can receive radio waves and convert the information into useable form. A "transceiver" generally refers to a component that can both generate radio waves and receive radio waves and is thus contemplated when either a transmitter or a receiver is discussed.

The term "processor" is used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory can also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device and memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, and similar electronic devices equipped with at least a processor configured to perform the various operations described herein.

The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

As used herein, the term "non-idle mode" refers to a state of operation for the disclosed beacon where the beacon is actively transmitting advertisement packets and/or receiving indications regarding advertisement packets. For instance, the beacon is actively transmitting advertisement packets when it is transmitting advertisement packets continuously or periodically over pre-defined time intervals. In contrast, "idle mode" refers to a state of operation for the disclosed beacon where the beacon is not actively transmitting advertisement packets and/or receiving indications regarding advertisement packets.

As used herein, "advertisement packet" refers to a signal transmitted by a beacon and may include a variety of information such as a beacon identifier, an actuator identifier, an actuator state indicator indicative of a state of the actuator, requests, instructions, information relating to measured parameters, location information, user information (e.g., biometric information such as a finger print and/or characteristics of a fingerprint), etc., and combinations thereof. An "indication" refers to a message transmitted to indicate receipt of an advertisement packet and/or action on the advertisement packet. The advertisement pack and/or the indication can include requests and/or instructions.

Existing beacons generally operate within short range communication networks, like Bluetooth or fixed radio frequency RF ranges, transmitting alert signals or advertisement packets continuously or periodically over pre-defined tine intervals for alerting users or other computing devices. Often, these devices continue to transmit the alert signals irrespective of the availability of devices for receiving such signals and/or irrespective of a demand or requirement of the alert signals at the receiver end. Continuous transmission of alert signals leads to early depletion of the device's battery and/or the device's resources, thereby requiring maintenance or replacement of the device and, thus, reducing the efficiency of the system.

The present disclosure provides an improved beacon device and associated systems and methods of using the same. The improved beacon is activated by external actuation to move from idle mode to non-idle mode and then subsequently moved from non-idle mode to idle mode. In particular, the beacon is activated from idle mode to non-idle mode, where transmission of the advertisement packet starts. When transmission of the advertisement packet is no longer needed, the beacon is moved from non-idle mode to idle mode. The beacon thereby is a more efficient system and will generally have a longer lifetime, thus, reducing maintenance time and costs.

Example embodiments described herein illustrate techniques for communicating advertisement packets from electronic devices, over a short range communication network such as Bluetooth. In this regard, the embodiments described herein illustrate techniques for changing the state of operation of an electronic device, such as a beacon device, from an idle mode to non-idle mode and vice versa. According to various example embodiments described herein, the beacon device includes an actuator for receiving inputs from a user and/or external environment to change the state of operation or mode of the beacon. In this regard, upon activating the actuator, the beacon state changes from idle mode to non-idle mode. In idle mode, the beacon does not transmit alert signals whereas in non-idle mode, the beacon starts transmitting the applicable advertisement packet(s). A user may provide inputs for actuating the actuator. In accordance with the embodiments described herein, based on activation of the actuator for instance, manually by a user or automatically based on inputs related to the external environment, the beacon is adjusted into non-idle mode where it starts transmitting the alert signals or advertisement packets over a short range communication network. Further, the beacon also includes a receiver for receiving indications that indicate whether advertisement packets transmitted by the beacon are being received at a destination or being acted upon. Moreover, once in receipt of the indication, the beacon may be changed from non-idle mode back to idle mode, where the beacon stops transmitting the advertisement packets. In other embodiments, when in receipt of the indication, the beacon may add information to the advertisement packet indicating that the advertisement packet was received by a master. The beacon may continue to transmit the advertisement packet until in receipt of an indication that the advertisement packet was acted upon and/or continue to transmit the advertisement packet to let other masters know that the advertisement packet was received and/or acted upon.

In some embodiments, the receiver of the beacon may receive the indication from a server via a client connected to the server. In such implementations, the server, upon receiving the advertisement packet, may respond to the advertisement packet with an indication, which is relayed via the client to the beacon. Additionally or alternatively, the server may also transmit the indication upon performing an action based on the advertisement packet received at the server.

In some embodiments, whether the beacon is in idle mode or non-idle mode is relative to the particular advertisement packet being transmitted. That is, in some embodiments, a beacon may be actuated to move from idle mode to non-idle mode and start transmitting a certain advertisement packet. Once in receipt of an indication, the beacon may be moved from non-idle mode to idle mode and stop transmitting the respective packet. However, the beacon may continue to transmit another advertisement packet, such as a smaller advertisement packet, requiring less energy to transmit, than the certain advertisement packet. In such cases, the beacon is still an improved beacon with increased efficiency due to the ability to change from idle mode to non-idle mode with respect to the certain advertisement packet. Further, the smaller advertisement packet may be stopped (thereby the beacon is in idle mode with respect to the smaller advertisement packet) or turned on as well (thereby the beacon is in non-idle mode with respect to the smaller advertisement packet). Various embodiments of the present disclosure are available without deviating from the intent of the present disclosure.

Thus, by the way of implementation of the illustrated embodiments described herein, more efficient and effective transmission of the advertisement packets from beacons may be available, as the beacon only transmits the advertisement packets when in non-idle mode. For instance, the beacon may only transmit an advertisement pack when a user or external environment actuates the actuator of the beacon. Further, the beacon may stop the transmission of the alert signals once an indication is received from a master. The indication may indicate that the advertisement packet was received and/or acted upon. By transmitting the advertisement packets on demand and stopping the transmission when not required, power consumption of the beacon device is reduced and more efficiently used. Thus, the battery or power resource of the beacon device can be operated for a longer duration and situations can be avoided where the beacon device fails to send advertisement packets due to insufficient power resource.

The components illustrated in the figures represent components that may or may not be present in various embodiments of the invention described herein such that embodiments may include fewer or more components than those shown in the figures while not departing from the scope of the invention.

Referring now to FIG. 1, a plurality of beacons 100 are shown in communication with a master 200. The beacons 100 are generally wireless devices configured for short-range communication (e.g., BLE (e.g., as an iBeacon), Wi-Fi, Ultra-Wideband (UWB), ZigBee, light in both the visible and invisible spectrum, etc.) that may allow for an advertisement (or broadcast) packet to be transmitted from the device. The advertisement packet may contain information about the device to allow remote auditing from any listening device (e.g., BLE, Wi-Fi, Ultra-Wideband (UWB), ZigBee, light in both the visible and invisible spectrum, etc.), which may generally be referred to as a master 200. The master 200 may be in the form of one or more computing devices capable of receiving the advertisement packet and acting on the information in the advertisement packet. It can be noted that the terms 'advertisement packet', 'advertisement message', or 'alert signals' may be interchangeable at various instances throughout the description of various embodiments here and has the same meaning. For instance, in some embodiments, the master 200 may be a mobile device, such as a cell phone or tablet, or any other BLE or Wi-Fi enabled device and may, in some embodiments, be fixed to a certain location, permanently or temporarily. In some embodiments, the master 200 may in turn transmit an indication to the beacon 100 indicating that the information in the advertisement packet was received and/or acted upon. The master 200 may also transmit multiple indications to the beacon 100 with each individual indication indicating that the information in the advertisement packet was received and/or acted upon.

Figure 2:
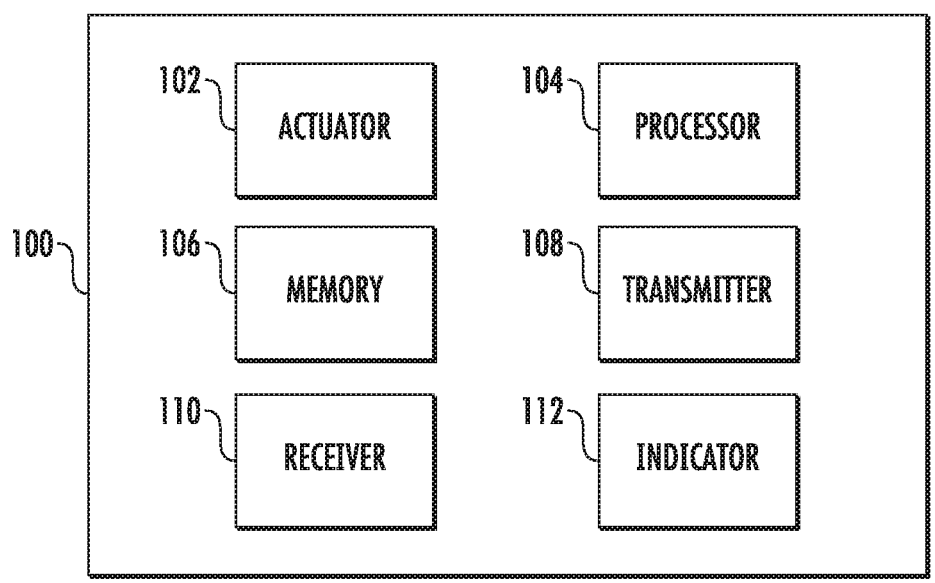
FIG. 2 illustrates a schematic block diagram of a beacon according to an example embodiment.

Referring now to FIG. 2, a beacon 100 is shown, wherein the beacon 100 comprises an actuator 102, a processor 104, a memory 106, a transmitter 108, and a receiver 110. In some embodiments, the beacon 100 may comprise a transceiver in addition to or in place of the transmitter 108 and receiver 110.

The actuator 102 is generally any component that can be manipulated to activate the beacon 100 leading to transmission of the desired advertisement packet from the transmitter 108. For instance, in some embodiments, the actuator 102 may be contained in a user interface that is operable to interact with a user and may generate outputs for presentation to the user. The user interface may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, the user interface component may include one or more output devices, including but not limited to a display, a speaker, a haptic feedback mechanism, a printer, lights, any other mechanism capable of presenting an output to a user, or any combination thereof.

The actuator 102 may include components for monitoring and/or collecting information regarding the user or external environment in which the beacon 100 is placed. For instance, the actuator 102 may include sensors, scanners, and/or other monitoring components. In some embodiments, sensors monitoring various parameters of the environment such as the temperature, humidity, and/or pressure may be included as part of the actuator 102. In some embodiments, sensors to monitor the presence of undesired gases such as, carbon monoxide may be included. In some embodiments, scanners may be used to determine the presence of certain individuals or items. For example, in some embodiments, the beacon may include a scanner, such as an optical scanner, RFID scanner, and/or other scanner configured to read human and/or machine readable indicia physically associated with an item.

According to various example embodiments, the actuator 102 may be of various types depending upon an area of application of the beacons 100. In this regard, depending upon the field of application, for instance, environments where the beacons 100 are deployed or installed, the actuator may be a button configured to be pressed by the user, a tactile sensor or a touch enabled icon configured to be activated based haptic or adaptive touch, a sensor configured to be activated based on sensing a parameter, a microphone module configured to be activated by receiving a sound signal, and/or any combinations thereof.

Illustratively, in one such area of application for the embodiments described herein, multiple such beacons 100 may be deployed in a retail store for transmitting alerts, regarding product availability to consumers or workers moving inside the retail store, over a short range communication network. For example, the beacons 100 may include RFID tags for transmitting radio frequencies which may be interrogated by RFID receivers. In this regard, multiple such beacons 100 may be located on various shelves or at different places in the inventory or the retail store, such that the beacons 100 transmit advertisement packets regarding the presence or absence of a product on the shelf or aisle. In some embodiments, the advertisement packets may be used as a location identifier to identify an item pick up location that an operator can utilize for picking up various items within the inventory. In such embodiments, the beacon may include the actuator 102 comprising a user interface, such as a touch-screen panel where a store operator can provide inputs for initiating or stopping the transmission of the alert signals. For instance, upon picking up an item, the store operator may press or touch an icon indicated on actuator panel for activating the actuator 102 and thereby, initiating the transmission of the alert signals from the beacon 100. It may be noted that by activation of the actuator 102, the processor 104 switches from an idle mode to a non-idle mode, such that, in the non-idle mode, the processor 104 is active and provides transmission of advertisement packets via the transmitter 108 continuously or at predetermined intervals, until the processor 104 goes back into the idle mode, which is done when the beacon 100 receives via the receiver 110 an indication from a master 200. The processor 104 switches the beacon 100 to idle mode. In the idle mode, the processor stops the transmission of the advertisement packets. Accordingly, the actuator 102 enables activation of processor 104 for initiating advertising by the transmitter 108 by changing the mode of the processor from the idle mode to the non-idle mode.

In another exemplary area of application for the embodiments described herein, multiple beacons 100 may be deployed in a manufacturing unit, where the beacons 100 may include components for monitoring and/or collecting information regarding the external environment. For instance, in a manufacturing or industrial unit, multiple beacons 100 may be deployed where the actuators 102 are in the form of sensors that are actuated based on sensed information. For example, the actuator 102 in such beacons 100 may include pressure sensors and/or humidity sensors which may sense the pressure or humidity in the environment. Accordingly, in such implementations, upon sensing the pressure or humidity to be at a pre-defined threshold level, the actuator 102 may be activated to transmit advertisement packets to maintenance staff deployed in the industrial unit. The beacons 100 may be changed to idle mode and stop transmission of the advertisement packets upon receipt via the receiver 110 of an indication whereupon the processor 104 changes the beacons 100 to idle mode.

It can be understood that the example application areas described above are for illustrative purposes only without prejudice, these illustrative application areas must not be construed as the only application areas wherein the techniques related to the present subject matter may be implemented. Accordingly, the various embodiments described herein may be implemented in various other areas of application.

As shown in FIG. 2, the beacon 100 may comprise a processor 104 and memory 106. The processor 104 may process information from the actuator 102 and/or indications regarding transmitted advertisements packages from the master 200. The processor 104 can direct or provide instructions to the transmitter 108 for transmitting advertisement packets when the actuator 102 receives an input from a user and/or an external environment. In this regard, the processor can be configured for adjusting the beacon 100 from idle mode to non-idle mode upon activation of the actuator 102. Accordingly, based on the activation of the actuator 102, the processor 104 can change the beacon from idle to non-idle mode and direct the transmitter 108 to transmit the advertisement packets in the non-idle mode.

Further, the processor 104 can also adjust the beacon 100 from non-idle mode to idle mode. In this regard, the processor 104 can be configured to change the beacon 100 state back into the idle mode, based on receiving an indication at the receiver 110 indicative of receipt of advertisement packets transmitted from the beacon 100 to a destination node, such as the master 200 and/or indicative of action undertaken in response to the advertisement packet.

In an example embodiment, the actuator 102 may communicate with the processor 104 regarding whether an advertisement packet needs to be transmitted. For instance, the actuator 102 may output information to the processor 104 which then determines if and/or what advertisement packet needs to be transmitted by the transmitter 108.

The processor 104 may include a single or multiple set of processors or multi-core processors. Moreover, processor 104 may be implemented as an integrated processing system and/or a distributed processing system. The memory 106 can be volatile or nonvolatile memory. The memory 106 can also be removable (portable) memory, Or non-removable (e.g., internal) memory. For example, the memory 106 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 106 is illustrated as being located within the beacon 100, embodiments of the present disclosure are not so limited. For example, memory 106 can also be located internal to another computing resource (e.g., enabling computer readable instructions to be downloaded over the Internet or another wired or wireless connection).

Additionally, in some embodiments, the beacon may include a data store device, which may be any suitable combination of hardware and/or software, that provides for mass storage of information, databases, and programs employed in connection with aspects described herein. For example, data store device may be a data repository for applications not currently being executed by processor 104.

In some embodiments, the beacon 100 can include one or more readable tags (e.g., near field communication (NFC)) tags, for example RFID tags for transmitting RF signals over short range communication network, such as Bluetooth. Further, the beacon may also comprise an indicator 112, such as a light emitting diode (LED) that may be configured to provide visual indications. For example, the indicator 112 may be configured to be activated when the actuator 102 receives an input from the user or an external environment. Accordingly, the indicator 112 in such situation can provide indications representative of the beacon to be in a non-idle mode wherein the transmitter 108 transmits the alert signals. For instance, the LED may automatically turn on upon actuation of the actuator 102. Further, the indicator 112 may be configured to be deactivated when the receiver receives an indication indicating the advertisement packet has been received and/or acted upon that is utilized for notifying the beacon 100 to turn off the transmission of advertisement packets. Accordingly, for instance, the LED can be deactivated and may be turned off as soon as the beacon 100 is in the idle mode and the actuator 102 is deactivated.

Figure 3:
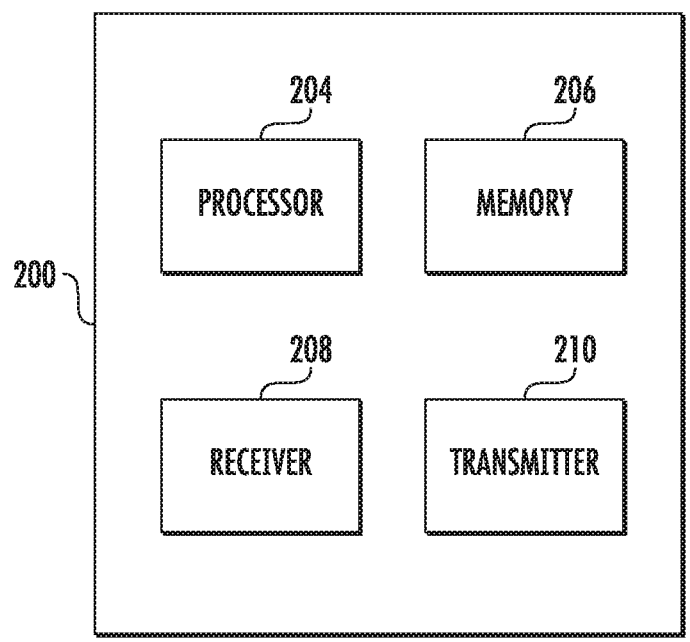
FIG. 3 illustrates a schematic block diagram of a master according to an example embodiment.

As shown in FIG. 3, the master 200 may include a processor 204 and a memory 206. In accordance with an exemplary embodiment described herein, the memory 206 may store instructions executable by the processor 204, or may comprise an application, that can receive the beacon's advertisement packets and, in some embodiments, notify a user (e.g., a safety inspector, supervisor, consumer, etc.) of any desired action, e.g., via a display on the master and/or lights or sounds from the master. In this regard, the master 200 can comprise a receiver 208 that receives the advertisement packets transmitted by the beacon 100. The master can also comprise a transmitter 210 that provides an indication to the beacon 100 indicating that the advertisement packet(s) have been received and/or acted on. For example, the master 200 may transmit an indication to the beacon 100, in response to the advertisement packet being received at the master 200. For instance, in an example implementation of the illustrated embodiment, the master can be a central server that receives the advertisement packets and performs an action based on information available in the advertisement packet, such as store information, calculate desired information, curate desired information, etc., and combinations thereof. Alternatively, in another example implementation of the illustrated embodiment, the master can be a mobile computing device within a short range communication network of the beacon, and can be communicatively coupled to the server over a wide range communication network, such that the server may generate the indication which the master receives and relays to the beacon 100.

The processor 204 may be configured with processor executable instructions to perform operations described herein, for example to execute actions needed by the beacon. The one or more processors 204 may function as controllers for the master 200. For example, one processor may be a primary controller while another may serve as a backup controller that may be swapped for the primary controller automatically or by maintenance personnel in the event of a failure without undue service downtime. The shared memory 206 may include an operating system (e.g., Windows, Linux, etc.) and real time extension.

The one or more processors 204 may execute various logical layers, applications, or modules including controls, scans, user interface data access, middleware routing, device communications, operating system services, and input/output drivers. The various logical layers, applications, or modules may be executed in conjunction with one another and exchange data with one another. As the one or more processors 204 receive inputs (e.g., signals from beacons and/or other devices) the various logical layers, applications, or modules may be executed individually and/or in concert by the one or more processors 204 to generate outputs (e.g., electrical signals to motor contacts, solenoid valves, switches, lamps, etc., data messages, or other output types). Applications may be received by the device from a server, for instance, and may be launched by a user and/or responsive to some other condition (e.g., the interaction between the master and the beacon). In some embodiments, applications can be executing as background applications. Applications may be and/or include a digital identity.

The one or more processor 204 may exchange data with scanners, sensors, actuators, diagnostic systems, controls, data store, and other devices (e.g., scales, printers, etc.) via network connections (e.g., TCP/IP connections, Ethernet connections, Ethercat connections, PROFIBUS connections, RS 232 connections, USB connections, Wi-Fi connections, cellular connections, etc.).

In some embodiments, the master 200 may be a mobile device carried by a user, where the mobile device may be operable to receive advertisement packets from one or more beacons 100. The mobile device may comprise a BLE communicator (which may at least comprise a BLE receiver) operable to receive the advertisement packets from the beacon 100. The mobile device may also comprise a display and an application operable to process the received advertisement packets, and may, in some embodiments, display the information contained in the advertisement packets. The mobile device can be a device carried or worn by a user. For example, the mobile device can be a phone (e.g., smartphone), personal digital assistant (PDA), tablet, and/or wearable device (e.g., wristband, watch, necklace, etc.).

According to example embodiment described herein, the master 200 can transmit indications corresponding to the packets advertised by the beacon 100 for various purposes depending upon an area of application. For instance, in reference to the example described previously, where multiple beacons 100 were deployed in the warehouse or inventory, the master 200 can be a mobile device carried by an operator that moves around the inventory for picking items. In such environment, the operator may receive an advertisement packet transmitted from the beacon 100 indicative of an item location on the shelf. The operator can pick the item upon receiving the location information. Further, the operator via the mobile device 200 can relay the advertisement message indicative of a location of an item and associated item picking task, to a central system, for example one used by a store manager of the inventory. Thereafter, the master 200 or the mobile device may receive an indication from the central system regarding receipt of the advertisement packet at the central system. In some situations, the indication may indicate an action performed by the central system based on information in the advertisement packet received at the master 200. For example, the central system upon receiving the advertisement packet may update the item count in a database associated with the central system that stores information about all the items available in the inventory. Accordingly, upon receiving the indication from the central system, the master 200 can relay the indication to the beacon 100. According to various embodiments illustrated herein, the advertisement packet or the indication received at the master 200 may be stored in the memory 206 and the processor 204 can perform parsing of the messages for sending forward or relaying the messages to the central system or beacon 100, respectively.

In another embodiment, master 200 can be a standalone device fixed at a location, such as a fixed master that could be installed which would detect the beacon's advertisements and give visual and/or audible indications automatically based on the received advertisement packet.

A fixed (or stationary) master 200 may be placed at significant areas, such as check points, entry points, doors, and/or turnstiles. The fixed device may be operable to receive advertisement packets from a plurality of beacons 100. The fixed device may comprise a BLE communicator (which may at least comprise a BLE receiver) operable to receive the advertisement packets from the beacon 100. The fixed device may also comprise one or more indicators, which may comprise lights, beepers, buzzers, etc., which may be activated when the fixed device receives an advertisement packet, indicating attention is needed with regards to the beacon 100. In some embodiments, the indicators of the fixed device may also comprise a display, operable to display the information contained in the advertisement packet received from the beacon 100.

In accordance with some example embodiments described herein, the master 200 may receive any of the advertisement packets transmitted by the beacon 100 and/or indications received from a central system. In this regard, the processor 204 can be configured to execute instructions for storing the respective message in the memory 206 and for parsing the advertisement packets or indications received from any of the beacon 100 and/or a central system respectively, and/or generate an appropriate indication. Accordingly, the master 200 upon parsing the messages can determine a request indicated in any of the advertisement packet or the indication. The advertisement packet or the indication may comprise a beacon identifier, such as a physical or MAC address of the beacon; an actuator identifier, such as a unique serial number of the actuator; an actuator state identifier that identifies a state of the actuator, for example, ON/actuated or OFF/non-actuated state of the actuator; and/or any combinations of identifiers thereof. The advertisement packet may also include a payload or an information message indicative of an action to be performed upon receipt of the advertisement packet. Accordingly, in case of the indications, the processor 204 may execute instructions for parsing the indication, determine a rightful beacon 100 based on accessing the beacon identifier from the parsed message, and relay the message to the beacon 100. In other embodiments, the processor 204 may generate indications, determine a rightful beacon 100 based on accessing the beacon identifier from the parsed message, and relay the message to the beacon 100. In case of the advertisement packets, the processor 204 may execute instructions for parsing the advertisement packet, perform an action based on the advertisement packet, forward the advertisement packet to an intended central system, and combinations thereof.

In some embodiments, the master 200 may involve more than one component or device. For instance, in some embodiments, the master 200 may include multiple computing devices and, in some embodiments, may include a client, such as a mobile device, in communication with a central location, such as a server. The client may communicate the information in the advertisement packet to a server and can notify the server to perform an action based on receipt of the advertisement packet and/or for logging and monitoring purposes. Once the server receives and/or acts upon the information, the server may in turn transmit an indication to the client indicating that the information has been received and/or acted upon. The client may then transmit an indication back to the beacon indicating that the information in the advertisement packet was received and/or acted upon. Based on the receiving of the indication at the beacon 100, the beacon adjusts the operating state via the processor 104 from non-idle mode back to the idle mode, such that in the idle mode, the processor 104 stops the transmission of the advertisement messages via the transmitter 108. Thus, by transmitting the indication to the beacon 100, it may not happen that the beacon 100 remains in the prolonged non-idle state, endlessly transmitting the advertisement packets. Rather, as soon as the beacon 100 receives the indication from the master 200, the processor 104 of the beacon switches its state from the non-idle mode to the idle mode, where the processor 104 may be inactive and doesn't transmit any advertisement message via the transmitter 108 of the beacon 100.

Figure 4:
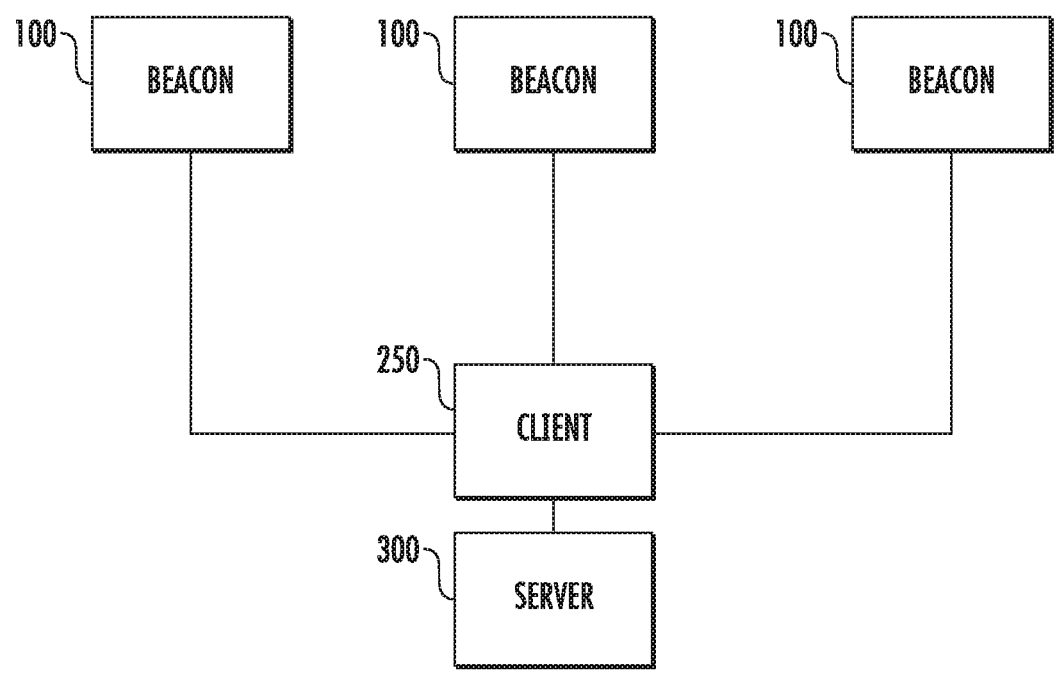
FIG. 4 illustrates a schematic of a system using a beacon according to an example embodiment.

FIG. 4 illustrates a system using a beacon 100 in accordance with an exemplary embodiment. As shown in FIG. 4, the system may comprise a plurality of beacons 100 and one or more clients 250 or auditor devices, such as a mobile device or a fixed device. The system also includes a server 300 in communication with the client 250. In some embodiments, a system may comprise a plurality of clients 250, including mobile devices and/or fixed devices.

The server 300 may be implemented in hardware, software, or combinations of hardware and software in one computing device or across a series of computing devices in communication with each other as needed to perform the functionality described herein. The various embodiments may be implemented using any of a variety of computing devices capable of functioning as a server. The computing device may also include a number of connector ports coupled to the processor for establishing data connections or receiving external memory devices, such as a USB or FireWire® connector sockets, or other network connection circuits for establishing network interface connections from the processor to a network or bus, such as a local area network coupled to other computers and servers, the Internet, the public switched telephone network, and/or a cellular data network. The computing device may also include the trackball or touch pad, keyboard, and display all coupled to the processor.

As illustrated in FIG. 4, one or more beacons 100 may be deployed in an environment, such that the beacons 100 advertises packets, such as packets representing alert messages, to any of a client 250 or a server 300. For instance, in one example embodiment, the beacons 100 may transmit the advertisement packets to the client, over a short range communication network, such as Bluetooth, following a Bluetooth low energy (BLE) protocol, like a Bluetooth smart (also commonly referred to as Wibree), which enables communications over the Bluetooth network using general attribute profile (GATT) based services. Alternatively in another embodiment, the short range communication network can be a classical Bluetooth network. In accordance with some embodiments, both the beacons 100 and the client 250 may communicate with each other, within the short range communication network, whereas, the client 250 and the server 300 may communicate over a wide range network, such as a wireless network. In such implementations, advertisement packets transmitted by the beacons 100 over the short range communication network are received at the client 250 and forwarded to the server 300 over the wide range network. Alternatively in some implementations, all three of the beacons 100, the client 250, and the server 300 may communicate amongst each other within the short range communication network.

With reference to the example embodiment described previously, wherein in the warehouse or inventory, multiple beacons 100 may be positioned at various locations in the inventory, such as on shelves or on aisles. In one example implementation, the client 250 can be a mobile device used by an operator on which the operator receives requests and/or instructions for performing various operations within the inventory and the master 300 can be a central server administered by a store manager for monitoring tasks associated with various inventories. In some embodiments, for instance, the operator using the mobile device or the client 250 may receive requests and/or instructions in the form of voice assisted commands over a headset that may connect to the mobile device. Additionally or alternatively, in such implementations, the operator may also receive visual commands on a display of the mobile device or the client 250 to perform various operations within the warehouse. The requests and/or instructions may be, for example, to pick an item from a shelf in the inventory, count the available items in the inventory, scan a barcode affixed on the item, interrogate an RFID tag affixed on an item or at a location, or various other requests or instructions. Accordingly, in some embodiments, the operator may desire to reach a correct location for performing the operation. Embodiments described herein may be useful in such cases, wherein the beacons 100 may transmit advertisement packets indicative of a location or availability of the items in order to assist the operator. In some embodiments, the mobile device or the client 250 may receive such advertisement packets as soon as the mobile device comes within a Bluetooth range of the beacons 100. Accordingly, the operator may perform a task of picking up an item and notifying via the mobile device for completion of the task to a server 300, administered by the warehouse manager.

The server 300 can be configured to communicate with the client 250 over a communication network, such as any of a wide range communication network or a short range communication network. In some embodiments, the server 300 can determine whether the server can address the advertisement packets received from beacons 100 directly or via the client 250 and accordingly act upon the received packets. In this regard, the server 300 may process the received advertisement packets for determining an action to be performed based on information in the received packet. For example, with reference to the example related to warehouse environment described previously, the server 300 may receive advertisement packets indicative of item location and/or a task assigned to an operator for picking an item. Accordingly, upon receiving the advertisement packet, an update can be performed by the server 300, for example updating a database storing a count or availability of items within the warehouse in a database associated to the server 300. Further, the server 300 may transmit back an indication to the beacon 100, in response to receiving of the advertisement packet or based on an action performed on the received advertisement packet. In some embodiments, the indication may be first received at the client 250, where the client processes the indication, for instance, and determines the beacon 100 to which the indication is to be relayed. Accordingly, the client 250 transmits the indication to the beacon 100 using any of the GATT or general access profile (GAP) based services that may be used for communicating and advertising messages over the short range communication network like Bluetooth. Alternatively, the server 300 may directly transmit the indication to the beacon 100, for instance, in situations wherein the server 300 is within short communication network range or within Bluetooth range of the beacon 100. In receipt of the indication, the beacon 100 is modified to idle mode by the processor 104 and stops transmitting the respective advertisement packet.

Figure 5:
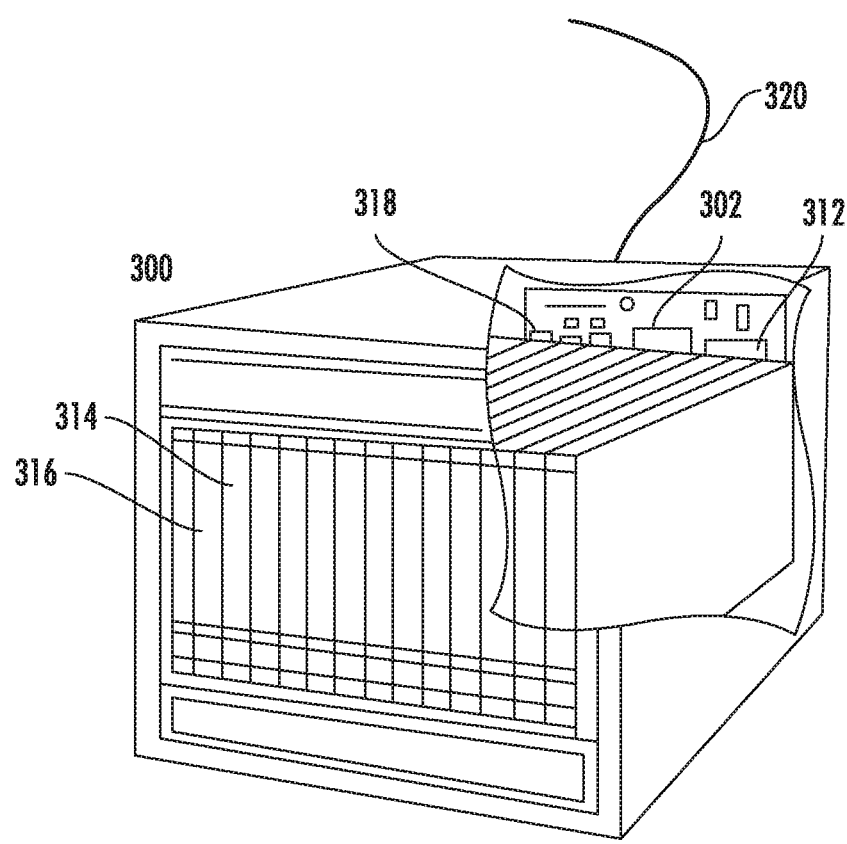
FIG. 5 illustrates a schematic of a server according to an example embodiment.

A variety of commercially available server devices, such as the server 300 illustrated in FIG. 5, may be used. Such a server 300 typically includes a processor 302 coupled to volatile memory 312 and a large capacity nonvolatile memory 314, such as a disk drive. The server 300 may also include a floppy disc drive, compact disc (CD) or DVD disc drive coupled to the processor 302. The server 300 may also include network access ports 316 coupled to the processor 302 for establishing network interface connections with a network 318, such as a local area network coupled to other computers and servers, the Internet, the public switched telephone network, and/or a cellular data network.

The server 300 may include other systems interfacing with the server 300 via network connections (e.g., TCP/IP connections, Ethernet connections, Ethercat connections, PROFIBUS connections, RS 232 connections, USB connections, Wi-Fi connections, cellular connections, etc.), such as user interface devices (e.g., a display, user terminal, etc.) displaying a local application or web application, host communication devices enabling communication with a host device (e.g., via FTP, TCP/IP, etc.), a database, or other external system (e.g., LMS).

In the embodiment illustrated in FIG. 4, the server 300 is in communication with the client 250. The client 250 can communicate with (e.g., exchange data with) the server 300 via a wired and/or wireless connection, for instance. In some embodiments, the client 200 can communicate using one or more communications modules (e.g., cellular, Wi-Fi, etc.). In some embodiments, the server 300 may be in communication with the client 250 and/or the beacon 100. In such embodiments, the beacon 100 will generally communicate with the server 300 via a wireless connection, for instance. Communication between various devices herein can be carried out over a wireless network. A wireless network, as used herein, can include Bluetooth, or any other suitable means to wirelessly transmit and/or receive information.

Figure 6:
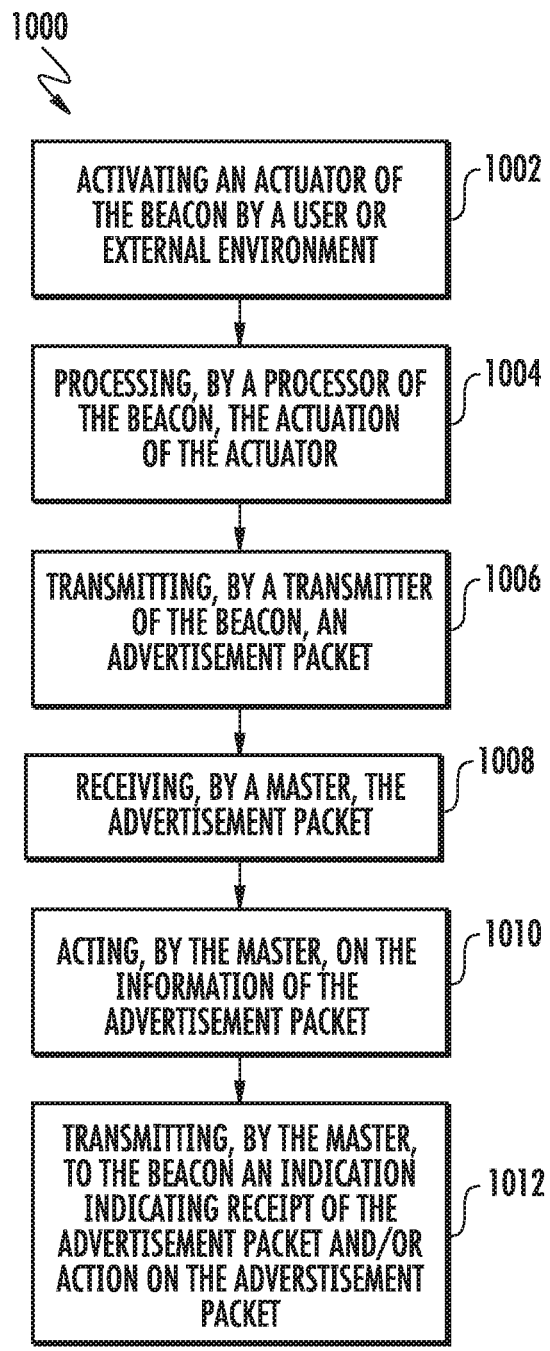
FIG. 6 illustrates a method for using a beacon according to an example embodiment.

FIG. 6 illustrates an exemplary embodiment of a method 1000 for using a beacon in accordance with an exemplary embodiment. In the illustrated embodiment, the method 1000 includes activating an actuator of the beacon by a user or external environment 1002. As described previously, in some example implementations, the actuator 102 may be activated manually by a user where the actuator includes an activation interface such as, button or touch panel. In some embodiments, the actuator may be self-activated or automatically activated based on an information sensed by a sensor of the beacon. Upon activation of the actuator, the method at step 1004 may include processing the actuation of the actuator, by a processor of the beacon. For instance, the processing may include, receiving a trigger or interrupt associated with the input provided by the user and/or external environment on the actuator 102. Accordingly, based on the trigger the processor may process the input to identify that the actuator is being activated. In this regard, by activation of the actuator 102, the processor 104 of the beacon switches from an idle mode to a non-idle mode, such that, in the non-idle mode, the processor 104 is active and provides transmission of advertisement packets via the transmitter 108 continuously or at predetermined intervals, until the processor 104 goes back into the idle mode.

Upon actuation of the actuator, the transmitter of the beacon at step 1006, may start transmitting an advertisement packet. The method further includes receiving, by a master, the advertisement packet 1008. As described earlier, the master may receive the advertisement packet directly from the beacon in situations when the master and beacons are within a short range communication network. Alternatively, the master may receive the advertisement packet via a client device which is within the short range communication network of the beacon. In such cases, the client device relays the advertisement packets received from the beacon and forwards the advertisement packets to the master over a wide range communication network. Upon receiving of the transmitted packet at the master, the method includes at step 1010, acting by the master, on the information of the advertisement packet, which may include determining whether the server can address the advertisement packet and acting on the advertisement packet. In this regard, the master may perform an action based on information contained in the advertisement packets. In this regard, the advertisement packet may include information regarding why the actuator was activated or merely indicates that the beacon has been alerted. For example, in application areas where the beacon devices includes sensors for monitoring parameters, such as humidity or pressure, within a manufacturing unit, the beacons may transmit alerts, in form of advertisement packets including information indicative of an alert condition raised due to a sensed condition. In such implementations, the master upon receiving alert messages, may initiate an action for notifying an emergency or rescue center or the master may generate commands to an external device for automatically controlling the pressure or temperature within the manufacturing unit. The master may also perform transmitting, as illustrated at step 1012, of an indication to the beacon, wherein the indication indicates receipt of the advertisement packet. The transmitting may also be performed by the master based on an action initiated by the master on the advertisement packet. In this regard, based on the receiving of the indication at the beacon 100, the processor 204 adjusts operating state from non-idle mode back to the idle mode, such that in the idle mode, the processor 204 stops the transmission of the advertisement messages via the transmitter 108. Accordingly, in the idle state, the processor 204 remains inactive and does not perform any transmission of advertisement packets, thereby, saving power resources of the beacon 100. Illustratively, the indication may include a command for switching back the processor 104 state from non-idle to idle mode and based on accessing the command the processor 104 changes state to idle mode.

Further, in some embodiments, the information contained in the advertisement packet may comprise the user and/or beacon identifier, in addition to or in place of any information regarding the reason for the alert. In some embodiments, the advertisement packet may be broadcast to any BLE enabled device within the range of the beacon.

When acting on the information of the advertisement packet, the master may indicate that the beacon has been alerted. Indicating that the beacon has been alerted may comprise initiating an alarm, a light, a beeper, a buzzer, or a combination thereof. In some embodiments, the master may display the information from the advertisement packet regarding the alert and/or beacon.

In some embodiments, the master may comprise a mobile device, and the method 1000 may comprise bringing the mobile device within the broadcast range of the beacon. In some embodiments, the master may comprise a fixed device, which is placed at a significant area, such as an entry point, a check point, a door, and a turnstile. In some embodiments, the method 1000 may further comprise bringing the beacon in proximity to the fixed device, such that the fixed device is within the broadcast range of the beacon.

Figure 7:
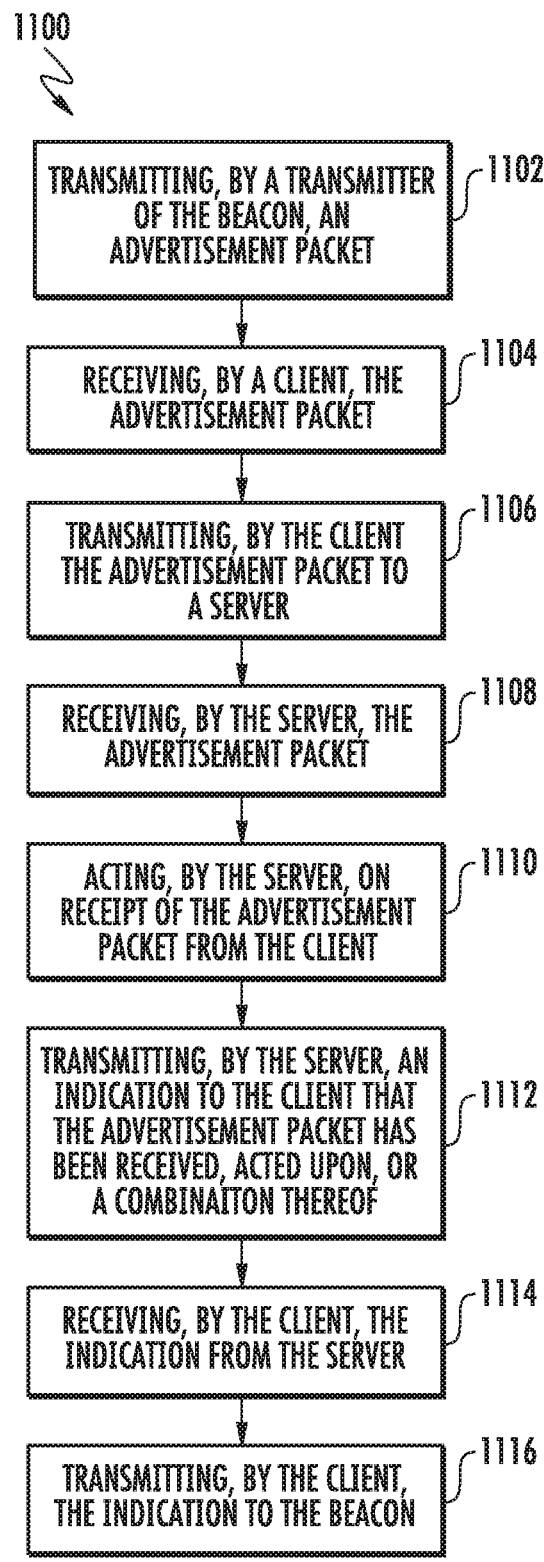
FIG. 7 illustrates a method for using a beacon according to an example embodiment.

In some embodiments, the master may include a mobile device alone or in communication with a central location, such as a server. For instance, FIG. 7 illustrates a method 1100 for using a beacon in accordance with an exemplary embodiment. Similar to FIG. 6, the method 1100 may include activating an actuator of the beacon by a user or external environment and processing, by a processor of the beacon, the actuation of the actuator (not shown). As shown in FIG. 7, the method 1100 may also include transmitting, by a transmitter of the beacon, an advertisement packet 1102. In this regard, the transmitting of the advertisement packets 1102 may be initiated based on activation of the actuator 102. It may be noted that upon activation of the actuator, the processor 104 of the beacon switches from an idle mode to a non-idle mode and starts transmitting the advertisement packets continuously over a short range communication network. In accordance with the illustrated embodiment, the method at step 1104 may include receiving, by a client the advertisement packet. In this regard, a client may be a mobile device or any other electronic device within a short communication network, for example Bluetooth range of the beacon. Illustratively, in some application areas, the beacons may include RFID tags for transmitting RF signals. The RFID tags may be affixed on various items or commodities or may be placed at various locations, such that when any RFID reader devices comes within the range of the beacons, the reader devices may interrogate the tags. In such cases, the client may be an RFID reader device carried by an operator which may receive RF signals transmitted by the RFID tags on the beacons. Upon receiving the advertisement messages, as illustrated at step 1106, the method may include transmitting the advertisement packet by the client to a server 1106. Further, the method at step 1108 includes receiving, by the server, the advertisement packet transmitted from the beacon. In accordance with the embodiments described herein, the client may relay or forward the advertisement packet transmitted by the beacon, which thereafter are received at the server. This may include, the client receiving the advertisement packet, parsing the advertisement packet, identifying a rightful server for transmitting or forwarding the advertisement packet, transmitting the advertisement packet to the server, or combinations thereof. Upon receipt of the advertisement packet from the client, the method includes, as illustrated at step 1110, acting on receipt of the advertisement packet from the client by the server. In this regard, the server may perform various actions depending upon information included in the received advertisement message as described earlier. Alternatively, in some implementations, the server may itself initiate an action, independent of information included in the advertisement message, as soon as the server receives the advertisement packet from the client. As illustrated at step 1112, the method includes transmitting, by the server, an indication to the client that the advertisement packet has been received, acted upon, or a combination thereof. In this regard, the indication may be as described earlier. Further, the method may include, as illustrated at step 1114, receiving, by the client, the indication from the server 1114. Accordingly at step 1116, the method includes transmitting, by the client, the indication to the beacon 1116. Thus, the client relays the indication received from the server to the beacon. By the way of transmitting the indication, thereby notifying the receipt and/or an action performed on the advertisement packet, by the server, the server by indication notifies the beacon to stop transmission of the advertisement messages. In this regard, the indication may include an actuator state indicative of a state of the actuator. For example, the indication may include the actuator state to be OFF or deactivated, so that upon the receiving of the indication, the beacon is changed from non-idle mode to idle mode.

Figure 8:
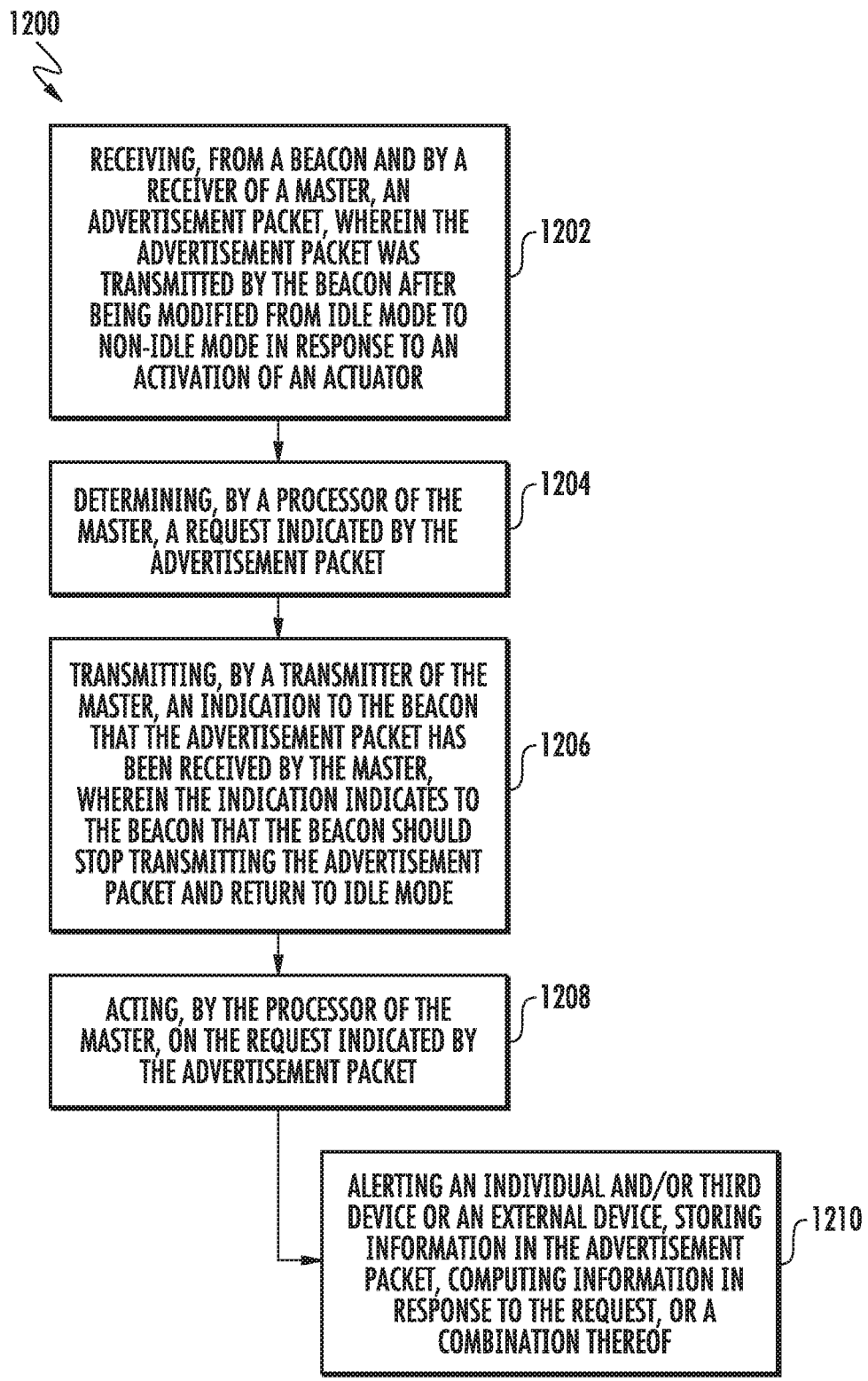
FIG. 8 illustrates a method for using a beacon according to an example embodiment.

FIG. 8 illustrates an exemplary embodiment of a method 1200 for the server or master 300 using information provided by a beacon 100. In the illustrated embodiment, the method 1200 includes receiving, by a receiver of the master 300 and from a beacon 100, an advertisement packet 1202. In this regard, the master 300 receives the advertisement packet which may be transmitted by the beacon after being modified from idle mode to non-idle mode. It may be noted, that as described previously, the beacon 100 may be in any of an idle mode or a non-idle mode such that, in the non-idle mode, the beacon 100 transmits the advertisements packets, whereas in the idle mode, the beacon stops transmitting the advertisement packets. Also, as described previously with reference to activation and deactivation of the actuator 102 of the beacon, the beacon 100 may be modified from the idle mode to the non-idle mode upon actuation of the actuator 102 by a user or any other external system or entity. Accordingly, as the actuator 102 of the beacon 100 is activated, the beacon 100 may start transmitting the advertisement packets which may be received at the server or master 300.

Further, the method 1200 includes determining, by a processor of the master, a request indicated in the received advertisement packet 1204. In this regard, the processor 104 of the master may parse or decode the received advertisement packet. Illustratively, the processor upon parsing the advertisement packet may access a payload which may also include a command including the request indicated by the beacon. For example, the advertisement packet may include a request indicative of an action to be performed by the master 300 such as, for generating an alert or performing an action, or notifying multiple clients, or updating a database upon receiving of the request and/or the like. Alternatively, in some example implementations, the request may also be indicative of a stop action, indicating that the master must stop performing a certain action which the master has been performing at that point of time. For example, in such cases, the request may indicate a stop action for example, stopping transmission of notifications to a client which is no more authorized to communicate within a network, or changing access rights for some computing nodes connected to the master 300, and/or the like. Upon determining the request from the advertisement packet, as illustrated at 1206, the method includes transmitting an indication to the beacon 100 that the advertisement packet has been received by the master 300. In this regard, the transmitter of the master 300 may send an indication (in the form of an acknowledgement packet) which may serve two purposes, viz. (a) indicate to the beacon 100 that the master 300 has received the advertisement packet transmitted by the beacon 100, and/or (b) indicate that the beacon 100 should stop transmitting the advertisement packet and returns to the idle mode. Accordingly, in such situations, based on the receiving of the indication from the master 300, the beacon 100, may stop the transmission of the advertisement packets and return back to idle mode, thereby saving power resources, like the battery of the beacon. It may be noted that (a) the beacon may be switched from an idle mode to the non-idle mode by an activation of the actuator 102 of the beacon and (b) the beacon 100 may be switched to an idle mode back from the non-idle mode based on receiving of the indication from the master 300. Thus, by the way of implementation of the method described in reference to FIG. 8, power management of the beacons 100 may be efficiently performed as the beacons 100 are not in continuous mode of signal transmissions, rather, based on demand, a user or an external system can switch the beacon 100 into a non-idle mode, thereby initiating the transmission of signals. Also, it may also not happen that after initiating the transmission of signals or advertisement packets, the beacon 100 remains in the prolonged non-idle state, endlessly transmitting the advertisement packets unless a battery of the beacon dies out. Rather, the beacon 100 automatically stops the advertising, once the beacon receives back an indication from the master 300.

In accordance with the embodiment described herein, the method may further include at 1208, acting by the processor 200 of the master 300 based the request in the advertisement packet. In this regard, the master may initiate an action, such as alerting an individual and/or third device or an external device, or storing information available in the advertisement packet in a database or a local memory, or computing some information in response to the request or any combinations thereof 1210.

FIGS. 6 through 8 illustrate example flowcharts of the operations performed by an apparatus, such as beacon of FIG. 1 and/or master of FIG. 3, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 6 through 8, when executed, convert a computer or processing circuitry into a particular machine configured to perform an example embodiment of the present invention. Accordingly, the operations of FIGS. 6 through 8 define an algorithm for configuring a computer or processor, to perform an example embodiment. In some cases, a general purpose computer may be provided with an instance of the processor which performs the algorithm of FIGS. 6 through 7 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module (or processor-executable instructions) which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the invention(s) set out in any claims that may issue from this disclosure. For instance, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. For example, the various elements or components may be combined or integrated in another system or certain features may be omitted or not implemented. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A beacon comprising:
a processor configured to adjust the beacon from an idle mode to a non-idle mode and from the non-idle mode to the idle mode, wherein the idle mode is a lower power mode than the non-idle mode;
a transmitter in communication with the processor and configured to transmit a first packet to a master device over a short-range communication network;

a receiver in communication with the processor and configured to receive an indication from the master device to deactivate the beacon; and wherein an actuator is in communication with the processor and configured to receive an input via an actuating interface or from a sensor in an external environment;

wherein the processor is configured to:
  determine if the first packet is to be transmitted by the transmitter based on actuating information provided to the processor by the actuator;
  in response to the determination that the first packet is to be transmitted and in response to the actuator receiving the input, change the beacon from the idle mode to the non-idle mode and direct the transmitter to transmit the first packet;
  change the beacon from the non-idle mode to the idle mode when the receiver receives the indication from the master device and the indication indicates that the first packet has been at least one of received or acted on; and
  in response to receiving the indication from the master device, transmit a second packet, wherein transmission of the second packet is lower power than transmission of the first packet, and wherein the second packet includes information pertaining to the reception of the first packet by the master device.

2. The beacon according to claim 1, wherein the transmitter transmits the first packet over a Bluetooth low energy (BLE) network at pre-defined intervals of time when the beacon is in the non-idle mode.

3. The beacon according to claim 1, wherein the beacon comprises a light emitting diode (LED) configured to provide a visual indication of the transmitter transmitting the first packet.

4. The beacon according to claim 1, wherein the first packet comprises a beacon identifier, an actuator identifier, an actuator state indicator indicative of a state of the actuator, or a combination thereof.

5. The beacon according to claim 3, wherein the LED is configured to be activated when the actuator receives the input from a user via the actuating interface or from the sensor in the external environment and is configured to be deactivated when the receiver receives the indication from the master device and the indication indicates that the first packet has been the at least one of received or acted on.

6. The beacon according to claim 1, wherein the processor is configured to direct the transmitter to stop transmitting the first packet when the receiver receives the indication from the master device and the indication indicates that the first packet has been at least one of received or acted on.

7. The beacon according to claim 1, wherein the actuator is a button configured to be pressed by a user, the sensor configured to be activated by sensing a parameter, a microphone module configured to be activated by receiving a sound signal, or a combination thereof.

8. A system comprising:
an electronic device comprising:
  a processor configured to change the electronic device from an idle mode to a non-idle mode and from the non-idle mode to the idle mode, wherein the idle mode is a lower power mode than the non-idle mode;
  a transmitter in communication with the processor and configured to transmit a first packet over a short range communication network;
  a receiver in communication with the processor; and
  an actuator in communication with the processor and configured to receive an input via an actuating interface or from a sensor in an external environment;
a client configured to transmit an indication to the receiver; and
a server configured to communicate with the client and configured to receive the first packet, determine whether the server can address the first packet, and act on the first packet,
wherein the processor is configured to:
  determine if the first packet is to be transmitted by the transmitter based on actuating information provided to the processor by the actuator;
  in response to the determination that the first packet is to be transmitted and in response to the actuator receiving the input, change the electronic device from the idle mode to the non-idle mode and direct the transmitter to transmit the first packet;
  change the electronic device from the non-idle mode to the idle mode when the receiver receives the indication from the client and the indication indicates that the first packet has been at least one of received or acted on; and
  in response to receiving the indication from the client, transmit a second packet, wherein transmission of the second packet is lower power than transmission of the first packet, and wherein the second packet includes information pertaining to the reception of the first packet by the server.

9. The system as claimed in claim 8, wherein the electronic device is a beacon and the short range communication network is a Bluetooth low energy network.

10. The system as claimed in claim 8, wherein the client is configured to transmit the first packet to the server, and wherein the first packet notifies the server to perform an action based on receiving the first packet.

11. The system as claimed in claim 8, wherein the server is configured to transmit the indication to the client at which point the client is configured to transmit the indication to the electronic device.

12. The system as claimed in claim 8, wherein the processor is configured to maintain the electronic device in the non-idle mode until the receiver receives the indication from the client and the indication indicates that the first packet has been the at least one of received or acted on.

13. The system as claimed in claim 8, wherein the client is configured to transmit the indication to the receiver over the short range communication network using Generic Attribute Profile (GATT) services.

14. The system as claimed in claim 8, wherein the first packet comprises an electronic device identifier, an actuator identifier, an actuator state indicative of a state of the actuator, or a combination thereof.

15. The system as claimed in claim 8, wherein the electronic device comprises a light emitting diode (LED) configured to provide a visual indication of the transmitter transmitting the first packet.

16. The system as claimed in claim 8, wherein the processor is configured to direct the transmitter to stop transmitting the first packet when the receiver receives the indication from the client and the indication indicates that the first packet has been the at least one of received or acted on.

17. A method comprising:
receiving, from a beacon and by a receiver of a master device, a first packet transmitted by the beacon after being modified from an idle mode to a non-idle mode, wherein the idle mode is a lower power mode than the non-idle mode, and wherein the first packet is transmitted in response to determining if the first packet is to be transmitted and in response to an actuator receiving an input;

determining, by a processor of the master device, a request indicated by the first packet;

transmitting, by a transmitter of the master device, an indication to the beacon that the first packet has been received or acted on by the master device, the indication indicates to the beacon that the beacon should return to the idle mode, wherein in response to transmitting the indication to the beacon, transmission of a second packet is initiated, and wherein transmission of the second packet is lower power than transmission of the first packet, and wherein the second packet includes information pertaining to the reception of the first packet by the master device.

18. The method as claimed in claim 17, wherein the first packet comprises a beacon identifier, an actuator identifier, an actuator state indicative of a state of the actuator, or a combination thereof.

19. The method as claimed in claim 17, further comprising acting, by the master device, on the request indicated by the received first packet.

20. The method as claimed in claim 19, wherein the acting, by the master device, on the request indicated by the received first packet comprises alerting at least one of an individual or third device as to the request, storing information in the first packet, computing information in response to the request, or a combination thereof.

* * * * *